United States Patent [19]
Gutierrez

[11] Patent Number: 5,878,626
[45] Date of Patent: Mar. 9, 1999

[54] COMPENSATION DEVICE FOR A CABLE-OPERATED BRAKE SYSTEM

[75] Inventor: Carmelo Gutierrez, Ehringshausen, Germany

[73] Assignee: Kuster & Co. GmbH, Ehringshausen, Germany

[21] Appl. No.: 875,892

[22] PCT Filed: Nov. 2, 1996

[86] PCT No.: PCT/EP96/04769

§ 371 Date: Oct. 21, 1997

§ 102(e) Date: Oct. 21, 1997

[87] PCT Pub. No.: WO97/20719

PCT Pub. Date: Jun. 12, 1997

[30] Foreign Application Priority Data

Dec. 6, 1995 [DE] Germany .................. 195 45 395.6
May 24, 1996 [DE] Germany .................. 196 20 941.2

[51] Int. Cl.$^6$ ...................................................... F16C 1/10
[52] U.S. Cl. ................ 74/500.5; 74/502.2; 74/501.6; 74/503
[58] Field of Search ................... 74/500.5–502.6

[56] References Cited

U.S. PATENT DOCUMENTS

| | | | |
|---|---|---|---|
| 2,732,723 | 1/1956 | Crofton | 74/110 |
| 2,772,574 | 12/1956 | Thomas | 74/110 |
| 3,180,673 | 4/1965 | Wanlass | 74/500.5 |
| 3,955,658 | 5/1976 | Bustmante | 74/530 X |
| 4,646,206 | 2/1987 | Bauer et al. | 74/503 X |
| 4,887,702 | 12/1989 | Ratke et al. | 192/4 A |
| 4,919,005 | 4/1990 | Schleicher | 74/501.6 |
| 4,920,819 | 5/1990 | Uchida et al. | 74/500.5 R |
| 5,012,689 | 5/1991 | Smith | 74/512 X |
| 5,392,668 | 2/1995 | Burnberger | 74/502.2 |

FOREIGN PATENT DOCUMENTS 424814  2/1935  United Kingdom .................. 74/500.5

*Primary Examiner*—Vinh T. Luong
*Attorney, Agent, or Firm*—Longare & White

[57] ABSTRACT

A compensating device (7) for a brake system driven by brake cables (4, 10), in particular a handbrake system for motor vehicles, wherein a drive lever (1) is connected by a first brake cable (4) to a first brake (21) and wherein a tube (5) of the first brake cable (4) rests on a drive-side support (6) and against the compensating device (7). A second brake cable (10) comprises an inner rope (9) connected at one end to the compensating device (7) and at the other end to a second brake (22). The compensating device (7) comprises a step-up gearing (20) and the first brake cable (4) comprises an inner rope (3, 3a) divided in two. One inner rope (3) is connected at one end to the drive lever (1) and at the other end to the input of the step-up gearing (20) and the other inner rope (3a) is connected at one end to the output of the step-up gearing (20) and at the other end to the first brake (21).

9 Claims, 4 Drawing Sheets

COMPENSATION DEVICE FOR A CABLE-OPERATED BRAKE SYSTEM

BACKGROUND OF THE INVENTION

1. Field of the Invention

The invention relates to a compensating device for a cable-driven brake system, in particular a motor-vehicle handbrake system. A drive, for instance a drive lever, is connected by a first brake cable to a first brake and a tube of the first brake cable rests on a support located at the generator side. The system comprises a second brake cable of which the inner rope is connected at one end to the compensating device and at the other end to the second brake.

2. Description of the Prior Art

Compensating devices are known in the state of the art. However, the known systems incur a problem in that the drive lever requires being moved through a large excursion to apply the brake. The excursion being the sum of the two displacement paths. In relation to another conventional brake system, with two separate brake cables for each brake, of which the inner ropes are directly connected to the drive lever, the drive excursion of the brake system evincing the initially cited features is twice as large. Another drawback of the known compensating device is that automatic length correction to automatically adjust the brake cables, is precluded.

In the light of this state of the art, it is the object of the invention to further develop a compensating device such that applying the brake requires only a reduced excursion of the drive lever. In an associated feature, the compensating device will assure automatic length correction of the brake cables, in particular automatic adjustment and resetting of brake-cable length.

SUMMARY OF THE INVENTION

The main object of the present invention is to improve the prior art devices. A compensating device comprises a step-up gearing and a first brake cable having an inner rope split in two. One inner rope is connected at one end to the drive and at the other end to the first brake. This compensating device offers the advantage of requiring only a reduced drive excursion to apply both brakes. When compared with those brake systems fitted with two separate brake cables between the drive and each brake, the invention offers the further advantage of only one drive cable being required between the drive and the compensating device. Therefore, material is saved and assembly is simplified. Overall, the compensating device of the invention insures that only a short drive excursion is required to apply both brakes and installation of two separate brake cables between the drive and the particular brake can be eliminated. It was found to be practically advantageous to use a transmission gear with a step-up of 1:2. In such a design, the drive excursion required to apply both brakes in the brake system fitted with the compensating device of the invention, is identical with the drive excursion of a system fitted with two separate brake cables between the drive and the particular brake.

In one advantageous embodiment of the invention, the step-up gearing comprises a gear displaceably guided in a clearance of a housing of the compensating device. The gear is directly or indirectly connected through a guide means to the inner rope connected to the drive. When using such a gear linked to the inner rope, the step-up gearing can be designed in a simple and economic manner.

It was found to be especially advantageous to mount two gear racks on opposite sides of the gear. The teeth of the gear racks mesh with those of the gears. One gear rack is supported in displaceable manner in the compensating device and is connected to the inner rope leading to the first brake. Upon actuation of the drive, and thus a tension exerted on the inner rope on the drive side, the gear will mesh with the opposite gear racks. Because of the gear displacement and rolling motion, the gear rack connected to the inner rope on the brake side is pulled-in at twice the excursion relative to the excursion on the drive-side inner rope. This displacement of the drive-side inner rope additionally is superposed with the motion of the compensating device on account of the reaction of the tube of the first brake cable. As a result, and with reference to a stationary vehicle point, a drive path is implemented for the two brake-side inner ropes to correspond to the drive path of the drive-side terminal rope whereas with the conventional brake systems, only half the excursion of the drive lever, i.e. drive, is required.

An especially advantageous compensating device automatically correcting the length of the brake cables, in particular automatically setting and resetting the length of brake cables, is achieved by displaceably supporting the other gear rack at the housing of the compensating device while the gear rack is prestressed by a tension spring. It is understood that kinematic return motion also may be achieved using a compression spring which would correspondingly load the other end of the gear rack. Rope slack in the brake system is thus eliminated by prestressing, whereby the gear rack is pulled or pushed in the appropriate direction to shorten the effective lengths of the inner ropes.

To assure reliable and problem-free operation of the compensating device while the drive is actuated, a lock means to affix the gear rack in case of drive actuation is mounted between the gear rack and the housing. When tensive forces are transmitted through the gearing to the brake-side inner ropes, the lock means assures that upon actuation of the drive, the gear rack shall be locked and shall be precluded from moving against the effect of prestressing.

In a further advantageous embodiment of the invention, the lock means is implemented by the gear rack comprising a serrate toothing cooperating with a matching toothing at the housing.

The serrate toothing and the matching toothing are designed and mounted in such manner that displacement of the gear rack relative to prestressing is reliably precluded. On the other hand, gear-rack displacement in the opposite direction, on account of prestressing to compensate any slack in the system, is easily possible because the serrate toothing and the matching toothing are able to easily slide past one another without any locking effect.

To assure simple assembly of the brake cables fitted with the compensating device of the invention, the gear rack for the delivery or pre-assembly state of the compensating device shall be fixed in such a position that the tension spring essentially is stretched to a maximum, or a compression spring is compressed to assume essentially minimum length. This design feature ensures maximum projection of the inner ropes relative to the particular guide tubes, whereby the inner ropes are easily assembled to the particular components, namely the drive or the brakes. Following assembly, the lock means is easily removed from the compensating device, thereby initiating the first setting of the length of the brakes or the inner ropes.

In a further advantageous embodiment of the invention, the brake-side inner ropes are partly received or guided inside a tube, the inner rope of the second brake being linked to the housing of the compensating device.

Further objects, advantages, features and applicabilities of the present invention are elucidated in the following description of the illustrative embodiments shown in the drawings. All described and/or pictorially shown features per se or in arbitrary, meaningful combinations are objects of the present invention, either independently of their integration into the claims.

DETAILED DESCRIPTION OF THE PREFERRED EMBODIMENT

Figure 1:
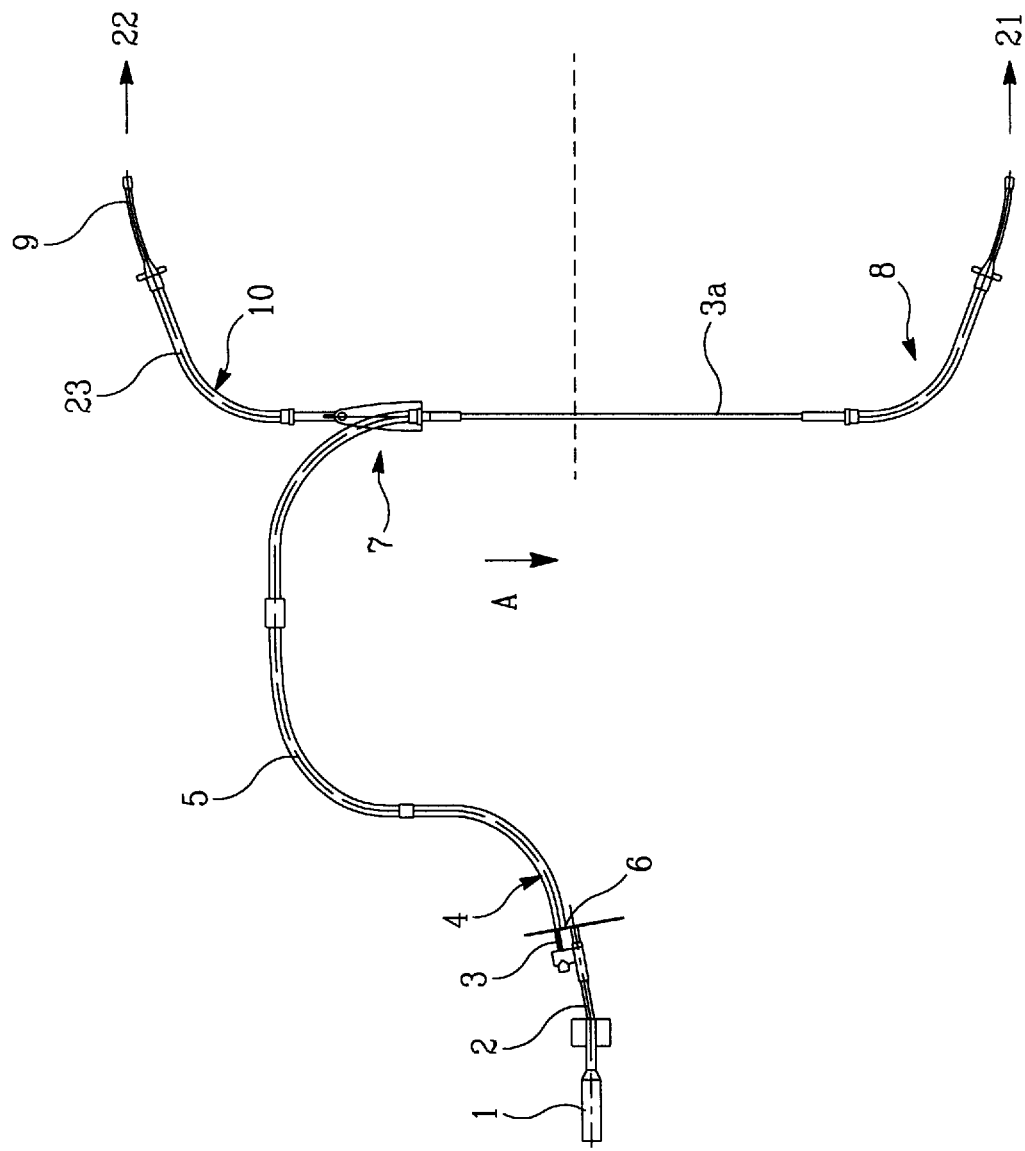
FIG. 1 symbolically shows a first embodiment of a brake system comprising the device of the invention.

The handbrake system of FIG. 1 comprises a drive lever 1 which is connected by a tension rod 2 to the inner rope 3 of the brake cable 4. The drive lever 1 can be directly linked to the inner rope 3 of the brake cable 4. The brake cable 4 comprises an outer tube 5 within which is guided the inner rope 3. The outer tube 5 is resistant to compression, for instance being wire-reinforced. The outer tube 5 of the cable 4 rests at its drive-lever side on a vehicle-side support 6. At its other end, the outer tube 5 is affixed to a housing 19 of a compensating device 7. The inner rope 3a leads to one brake 21 of the vehicle where another tube 8 is provided for reversal. An inner rope 9, guided in a tube 23 of a further brake cable 10, is linked to the housing 19 of the compensating device 7 and leads to the second brake 22 on the opposite vehicle side.

This brake system of the present invention operates in such manner that when pulling the drive lever 1, a tension is exerted on the inner rope 3 of the brake cable 4, whereby the inner rope 3 is pulled in the direction of the drive lever 1 and the first brake 21 is applied by the inner rope 3a. On account of the tensive displacement exerted on the inner rope 3, a reactive force is set up in the opposite direction on the tube 5, whereby the compensating device 7 mounted in floating manner on the vehicle, is displaced in the direction of the arrow A, and thereby the inner rope 9 of the brake cable 10 is displaced in this direction, and the second brake 22 is applied.

Regarding conventional systems lacking the compensating device 7 of the present invention, the drawback is incurred that a large excursion of the drive lever 1 is needed to apply the brakes 21, 22, where the excursion is the sum of the drive paths of both brakes 21, 22. Compared with a brake system comprising two separate brake cables between the drive lever 1 and the brakes 21, 22, the drive excursion in the former conventional system is twice that of the present invention.

To compensate for the drawback of known systems, a compensating device 7 is provided and is shown in detail as different variants in FIGS. 2 through 6. This compensating device 7 evinces a substantial feature in that the inner rope 3 is divided into two inner ropes 3, 3a. The connection of the two inner ropes 3, 3a is implemented by a step-up gearing 20 mounted in the compensating device 7.

Figure 5:
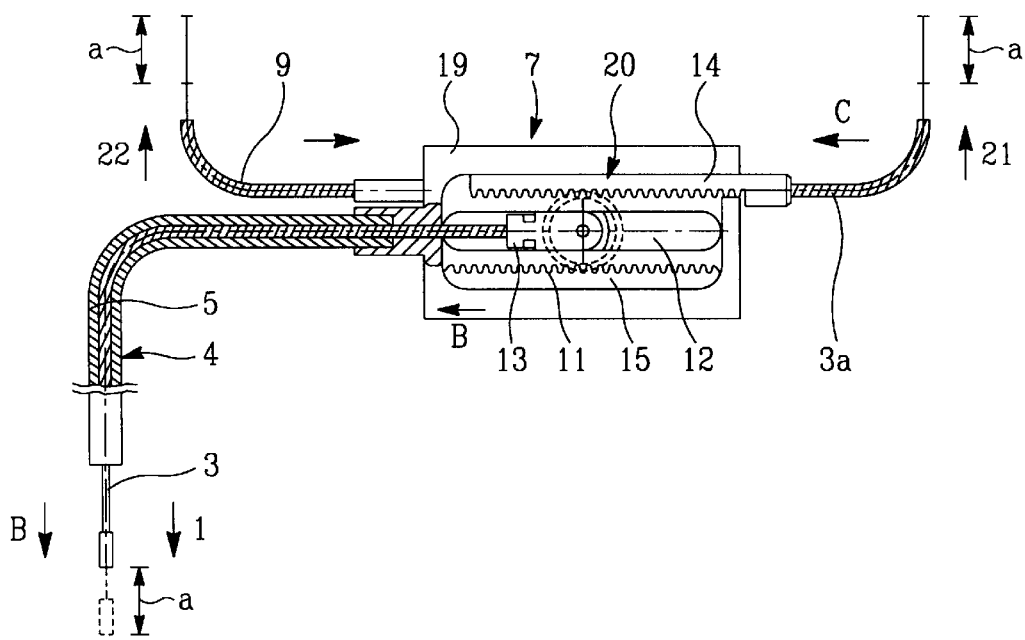
FIG. 5 is a further embodiment of the compensating device of the invention with actuated drive.
Figure 6:
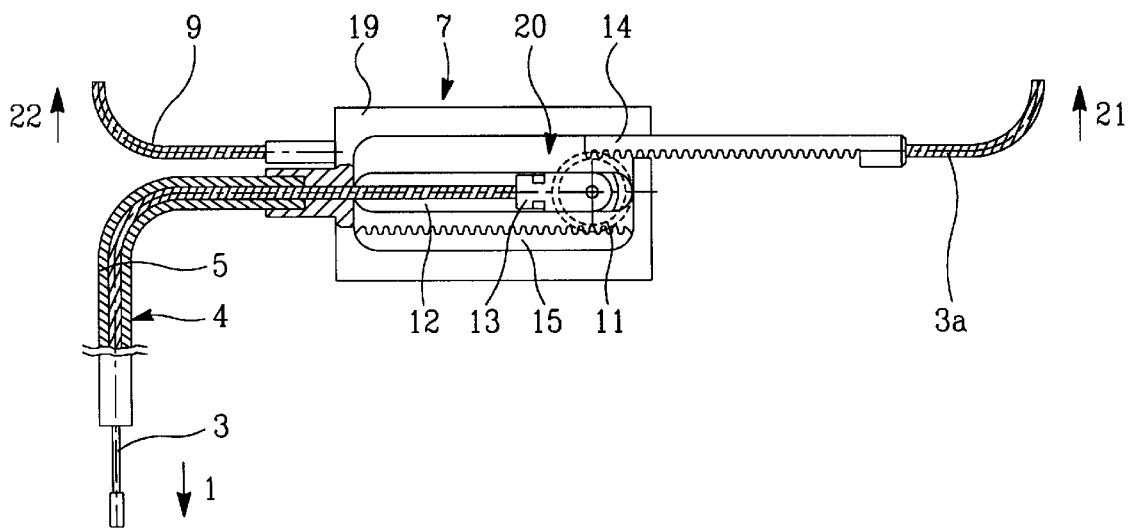
FIG. 6 shows the compensating device of FIG. 5 when the drive is deactivated.

In the illustrative embodiment of FIGS. 5 and 6, the step-up gearing 20 of the compensating device 7 comprises a gear 11 displaceably guided inside a clearance 12, acting as the guide, of the housing 19. A guide piece 13 is provided for that purpose and slides within the clearance 12. The inner rope 3 is connected at one end to the guide piece 13. The gear 11 meshes with two gear racks 14, 15 mounted in the compensating device 7 on opposite sides of this gear 11 to thereby define the lock element 24. The gear rack 15 is affixed in a stationary manner to the compensating device 7 in the embodiment of FIGS. 5 and 6. The opposite gear rack 14 is supported in displaceable manner in the compensating device 7, that is in the clearance 12 of the housing 19. One of the free ends of the gear rack 14 is connected to one end of the inner rope 3a being part of the inner rope 3. The inner rope 9, of the brake cable 10 leading to the second brake 22, is rigidly joined or linked to the housing 19 of the compensating device 7.

The position of the compensating device 7, or that of the step-up gearing 20 of FIG. 6, is that of the unactuated state of the drive lever. The displaceable gear rack 14 is pulled as much as possible on account of the return spring of the brake 21 out of the compensating device 7. When the drive lever 1 is pulled on, ie. actuated, and a tensive force is exerted in the direction of the arrow B on the inner rope 3, the gear rack 11 will mesh with the opposite gear racks 15, 14. By displacing the gear 11 in the direction of the arrow B and rolling the gear 11 along the gear rack 15, the gear rack 14 undergoes a resultant pull-in motion in the direction of the arrow C of double the excursion compared to the excursion of the traction displacement of the inner rope 3. This double excursion of the inner rope 3a is superposed on the displacement of the floatingly supported compensating device (s) 7 in the direction of the arrow D on account of the reactive force of the tube 5 (FIG. 5). Thereby an actuation path or excursion of the inner rope 3a, or of the inner rope 9 corresponding to the actuation path or excursion of the inner rope 3, will result relative to a stationary vehicle point. Compared to the conventional brake system, only half the displacement of the drive lever 1 will be required. Consequently, the compensating device of the invention converts an excursion "a" of the inner rope 3 into an excursion "a" of the brake-side inner ropes 3a, 9. As a result, a brake system fitted with the compensating device of the invention, behaves like a conventional brake system wherein a separate brake cable is mounted between each of the two brakes 21, 22 and the drive lever 1.

Figure 2:
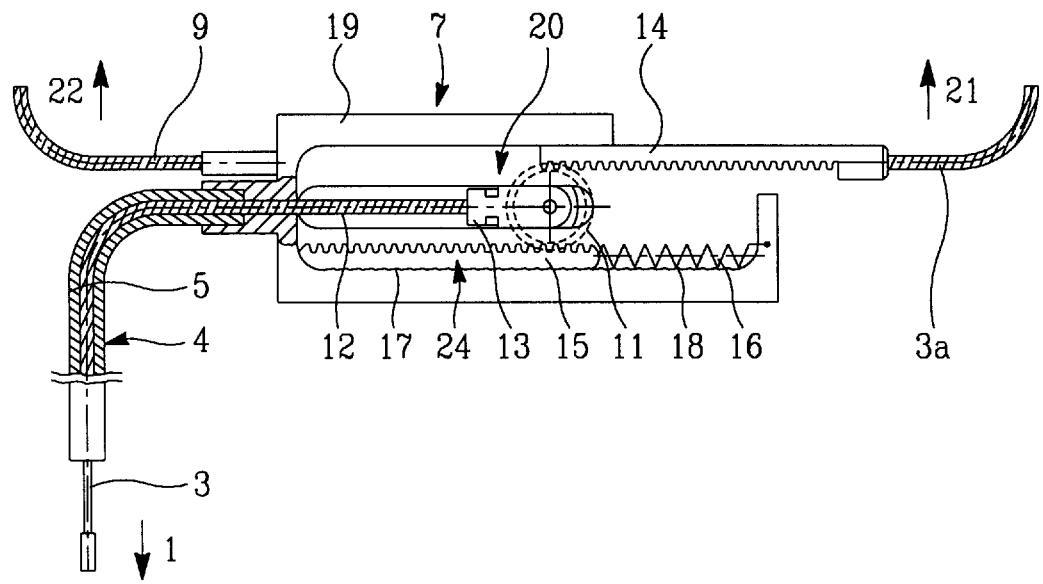
FIG. 2 shows a compensating device of a first embodiment of the invention in its state of delivery.
Figure 3:
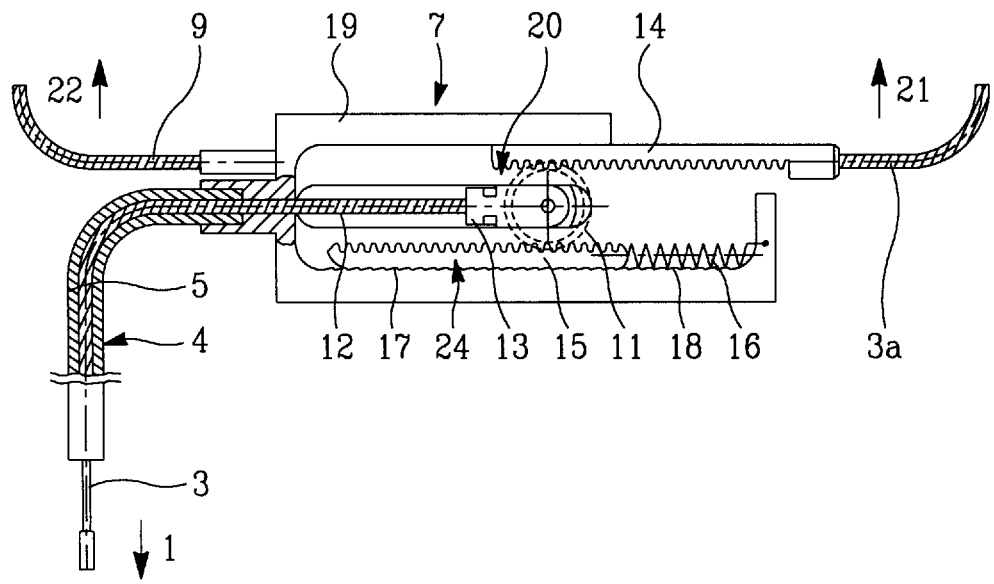
FIG. 3 shows the compensating device of FIG. 2 following first setting and with an unactuated drive.
Figure 4:
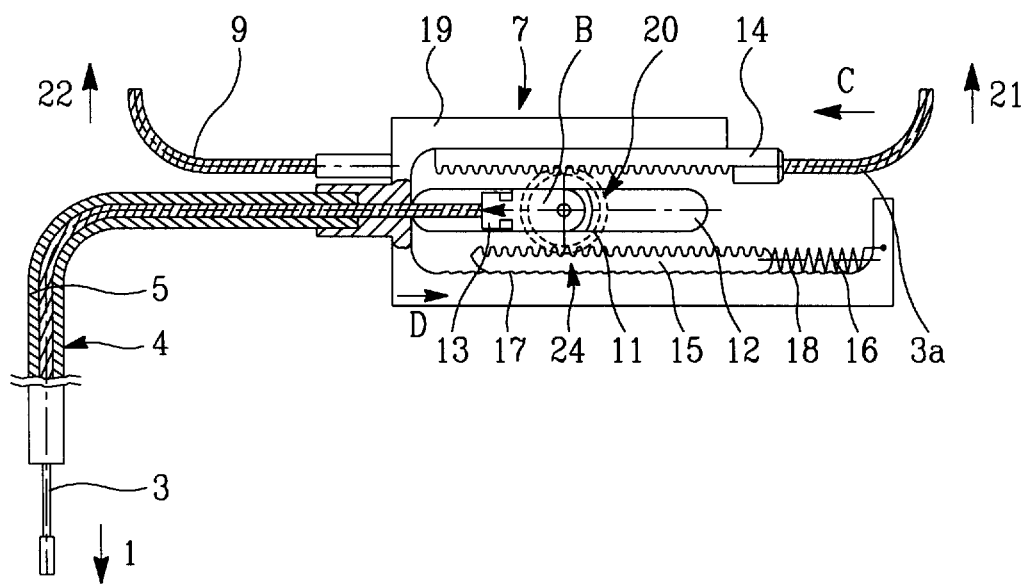
FIG. 4 shows the compensating device of FIG. 3 when the drive is actuated.

Regarding the embodiment of FIGS. 2 through 4, the compensating device 7 of the present invention comprises additional means for automatically compensating the length of rope slack in the brake system, or to implement an initial setting. This length compensation is achieved by supporting the gear rack 15, in displaceable manner within the compensating device 7, and providing a prestressing tension spring 16 acting on one end of the gear rack 15 while being affixed at its other end to the housing 19 of the compensating device 7 within clearance 12 of the housing 19. Moreover, the gear rack 15 comprises a serrate toothing 17 at its lower side to cooperate with a matching toothing 18 at the housing 19. The serrate toothing 17 and the matching toothing 18 are designed in such manner, and mounted in such a way, that the gear rack 15 cannot be displaced against the bias of the tension spring 16.

In the delivered, ie pre-assembly state of the brake system, the gear rack 15 is moved into a position shown in FIG. 2. The inner ropes 3a, 9 and 3 evince maximum projection beyond the tubes 8, 10 and 5, thereby allowing simple assembly, or hookup, of the free ends of the inner ropes 3a, 9, 3 to the particular components, especially the drive lever 1 and the brakes 21, 22. The locking of the gear rack 15, when in this pre-assembly position of FIG. 2, can be implemented by a removable lock means (not shown). To release the tension spring 16 and the gear rack 15, the lock means is removed following assembly of the brake system, and as a result the gearing shown in FIG. 3 adjusts itself automatically. Any rope slack present in the brake system is taken up by the tension spring 16 which then pulls the gear rack 15 in the direction of arrow E. Through the serrate toothing at its underside, the gear rack 15 thereby slides over the corresponding matching toothing 18 mounted on the housing 19 of the compensating device 7. The meshing of the serrate toothing 17 with the matching toothing 18 precludes a displacement of the gear rack 15 in a direction opposite the direction of arrow E, that is opposite the prestressing of the gear rack 15. The gear 11 is rotated during the compensating displacement of the gear rack 15 in the direction of the arrow E, and consequently the second gear rack 14 is pulled into the compensating device 7. Where there is rope slack in the inner rope 9, the reaction against this pull-in displacement on the housing 19 will cause a compensation displacement of the floatingly supported compensating device 7 in the direction E, whereby rope slackness can be removed from the system. Where rope slackness is present in the inner rope 3 leading to the drive lever 1, such slack will be eliminated by the displacement of the compensating device 7 in the direction of arrow E. If the brake is subsequently actuated, such rope slackness will be eliminated by the displacement of the compensating device 7 in the direction of the arrow E.

When actuating the drive lever 1, following the first adjustment as shown in FIG. 4, the gear rack 15 will be locked in place by the serrate toothing engaging the matching toothing 17 against a displacement opposite the direction of the arrow D so that the operation of the compensating device 7 (already described in relation to FIGS. 5 and 6) takes place. Regarding the actuation of the drive lever 1, the gear rack 15 may be considered stationary relative to the housing 19 because of the cooperation of the serrate toothing 17 and matching toothing 18. However, contrary to the case of the embodiment of FIGS. 5 and 6, the modified embodiment of FIGS. 2 through 4 offers the advantage of automatic length compensation for the brake cables of the brake system.

While the foregoing invention has been shown and described with reference to a preferred embodiment, it will be understood by those possessing skill in the art that various changes and modifications may be made without departing from the spirit and scope of the invention.

I claim:

1. A compensating device (7) for a brake system, said compensating device comprising:

a drive, having a drive lever (1), connected by a first brake cable (4) to a first brake (21) and a tube (5) of the first brake cable (4) which rests on a drive-side support (6) and on the compensating device (7); and a second brake cable (10) of which an inner rope (9) is linked at one end to the compensating device (7) and at the other end to a second brake (22), wherein, the compensating device (7) comprises a step-up gearing (20) and the first brake cable (4) comprises a first and second inner rope (3, 3a) said first inner rope (3) being connected at one end to the drive and at the other end to an input of the step-up gearing (20) and the second inner rope (3a) being connected at one end to an output of the step-up gearing (20) and at the other end to the first brake (21).

2. Compensating device as claimed in claim 1, wherein the step-up gearing (20) comprises a gear (11) displaceably guided in a clearance (12) of a housing (19) of the compensating device (7), said gear (11) being connected by a guide piece (13) to the first inner rope (3).

3. Compensating device as claimed in claim 2, wherein first and second gear-racks (14, 15) are mounted on opposite sides of the gear (11), first teeth of said gear-racks meshing with second teeth of the gear (11), said first gear-rack (14) being displaceably supported in the compensating device (7) and being connected to the second inner rope (3a).

4. Compensating device as claimed in claim 3, wherein the second gear-rack (15) is mounted in stationary manner to the compensating device (7).

5. Compensating device as claimed in claim 3, wherein the second gear-rack (15) is supported in displaceable manner against the action of a prestressing means in the housing (19) of the compensating device (7).

6. Compensating device as claimed in claim 5, wherein a lock-means to fix in place the gear-rack (15) during drive actuation is mounted between the gear (15) and the housing (19).

7. Compensating device as claimed in claim 6, wherein the second gear-rack (15) comprises a serrate toothing (17) cooperating with a matching toothing (18) of the housing (19).

8. Compensating device as claimed in claim 7, wherein the serrate toothing (17) and the matching toothing (18) are mounted in a manner to preclude displacement of the second gear-rack (15).

9. Compensating device as claimed in claim 8, wherein the second inner rope (3a) and the inner rope (9) of the second brake cable are at least partly guided in a second tube (8, 23) and the inner rope (9) is linked to the housing (19).

* * * * *